(12) United States Patent
Yang et al.

(10) Patent No.: US 7,723,887 B2
(45) Date of Patent: May 25, 2010

(54) MOTOR ROTOR

(75) Inventors: Shih-Jen Yang, Taipei (TW); Hung-Sen Tu, Taipei (TW); I-Hsing Chen, Taipei (TW); Chen-Chia Yang, Taipei (TW)

(73) Assignee: System General Corporation, Taipei (TW)

( * ) Notice: Subject to any disclaimer, the term of this patent is extended or adjusted under 35 U.S.C. 154(b) by 22 days.

(21) Appl. No.: 12/121,106

(22) Filed: May 15, 2008

(65) Prior Publication Data

US 2009/0195101 A1    Aug. 6, 2009

(30) Foreign Application Priority Data

Feb. 4, 2008    (TW) .............................. 97104142 A

(51) Int. Cl.
*H02K 21/12*    (2006.01)
(52) U.S. Cl. ............................. 310/156.22; 310/156.01
(58) Field of Classification Search ................................ 310/156.01–156.84
See application file for complete search history.

(56) References Cited

U.S. PATENT DOCUMENTS 5,811,904 A * 9/1998 Tajima et al. .......... 310/156.45
2002/0125780 A1 * 9/2002 Shiratori ................ 310/156.21
2005/0046294 A1 * 3/2005 Rinholm et al. ........ 310/156.22
2008/0278018 A1 * 11/2008 Achor ................... 310/156.12

FOREIGN PATENT DOCUMENTS

| TW | 412100 Y | 11/2000 |
|----|----------|---------|
| TW | 579137 Y | 3/2004 |
| TW | 595072 B | 6/2004 |
| TW | 302825 Y | 12/2006 |
| TW | 312835 Y | 5/2007 |

* cited by examiner

*Primary Examiner*—Nguyen N Hanh

(57) ABSTRACT

A motor rotor is provided. The motor rotor includes a plurality of magnetic members circumferentially disposed on a peripheral wall surface of a turning axle of the motor rotor, and both end surfaces of the turning axle are coupled with fastening members respectively; each of the magnetic members has a first fastening portion formed at each of its two ends; and the fastening member is provided with a plurality of second fastening portions corresponding in position to the first fastening portions, such that each of the magnetic members are firmly fixed in position to the turning axle.

20 Claims, 7 Drawing Sheets

MOTOR ROTOR

BACKGROUND OF THE INVENTION

1. Field of the Invention

This invention generally relates to a motor rotor, and more specifically, to a motor rotor that adopts magnetic force.

2. Description of Related Art

Motors convert electric energy to mechanic energy, thereby providing output rotational motions; and in addition to directly providing rotational motions, output rotational mechanic energy can also work with various mechanisms and then convert into linear motions or vibratile motions.

A motor that provides rotational motion consists of motor and stator, wherein the stator is a portion for fixing and providing ambient magnetic field, while the rotor is a portion that is rotatable in response to the magnetic field. A common rotor comprises a turning axle and a plurality of magnetic members, e.g. permanent magnets, wherein the turning axle is made of a plurality of magnetically permeable elements, e.g. stacked silicon steel sheets, and the magnetic members are circumferentially disposed on the peripheral wall surface of the turning axle.

Taking permanent magnets as an example, glue is commonly applied to between the turning axle and the permanent magnets, e.g. resin glue, for fixing in position the permanent magnets to the turning axle. However, since permanent magnets are fixed in position to the turning axle by means of gluing, the permanent magnets are likely to fall off as a result of the effects of external usage surroundings and/or pressure. Once the permanent magnets fall off, the motor rotor will definitely be incapable of rotating normally, and even worse, the permanent magnets may be stuck in the stator.

Common factors of external surroundings that cause the foresaid falling-off of permanent magnets include, but are not limited to, temperature and humidity. Where ambient temperature at which the motor works changes dramatically, e.g., in the frigid zone, where temperature is below zero, since coefficients of thermal expansion of permanent magnet and silicon steel sheet are different, delamination is likely to happen due to difference in size variation; in addition, when motor usage surroundings humidity is changing dramatically, e.g. under water or in a humid area, since silicon steel sheet is likely getting rusty and accumulating rust, and the rust is pushing away the glue layer (solidified glue) and eventually causing delamination. Although the aforesaid effects of the factors of external surroundings are not attributable to the quality of the motor, as a matter of fact, the aforesaid effects indeed directly shorten the life of the motor; therefore, it is an urgent issue in the motor industry as to how to overcome the drawback of a shortened life span of motors caused by external surroundings factors.

In order to overcome the drawback of a short life span of motors caused by the gluing technique, the prior art is cited herein, including Taiwanese Patent No. 595072, Taiwanese Patent No. 579131, Taiwanese Patent No. 412100, Taiwanese Patent No. M302825, and Patent No. M312835, etc.

In general, manufacturers adopt designs of assembly to assemble a turning axle and permanent magnets. The most common adopted designs of assembly is characterized by forming a plurality of equidistantly spaced coupling slots on the peripheral wall surface of a turning axle, and each of the coupling slots is coupled with a corresponding permanent magnet. However, since silicon steel sheets and permanent magnets are made by different fabrication techniques, their fabrication precision are of different levels, thereby causing a great deal of variations in assembly combinations. The variations in assembly combinations frequently further cause the fragile permanent magnets to crack while coupling with the coupling slots in the assembly process, thereby leading to poor yield in the assembly process.

Taiwanese Patent No. 412100 disclosed a motor rotor, wherein a turning axle is formed by stacking a plurality of silicon steel sheets, and then a plurality of equidistantly spaced fixing slots are disposed on a peripheral wall surface of the turning axle. Each of the fixing slots receives a fastening bolt, and any two neighboring fastening bolts are coupled with a permanent magnet within the two neighboring fastening slots; and each end of the turning axle is disposed with an end cover plate for fixing in position the permanent magnets and the fastening bolts to the turning axle, thereby preventing the permanent magnets and the fastening bolts from falling off either end of the turning axle.

In the foresaid patent, in order to engage the permanent magnets to the turning axle, two additional fastening bolts are disposed for each of the permanent magnets; and in order to correct a matching error related to fabrication precision, two additional end cover plates are further provided; thereby not only increasing cost of assembly elements and assembly process and stockpile, but also reducing the yield greatly. In addition, since stamping precision level of forming fixing slots on silicon steel sheets is at least double compared with fabrication precision level of permanent magnets, assembly precision is unlikely to be controlled well, and clearance fit or interference fit commonly happens to assembly relation. In case of interference fit, a penetrating fastening bolt pushes and impacts the permanent magnet and thereby directly cracks and damages the permanent magnet, thereby seriously affecting the yield and keeping production costs high.

According to the Taiwanese Patent No. 595072, a motor rotor is provided, wherein the motor rotor comprises a turning axle, a plurality of permanent magnets, and inserting small teeth; the turning axle is wholly made of silicon steel instead of stacking a plurality of silicon steel sheets as shown in structure design of prior art; a plurality of coupling bumps equidistantly spaced apart from one another are circumferentially formed on the peripheral wall surface of the turning axle, and each of the permanent magnets is correspondingly disposed between the two neighboring coupling bumps circumferentially formed on the peripheral wall surface of the turning axle, and then correspondingly inserting an inserting small tooth with a corresponding coupling groove into each of the coupling bumps, thereby holding and fixing in position each of the permanent magnets by two neighboring inserting small teeth.

However, each of the foresaid inserting small teeth must be fabricated according to size and shape of the permanent magnets. Moreover, each of the coupling grooves must be fabricated in accordance with shape and size of each of the coupling bumps, and obviously demanding higher fabrication technique and precision level. Besides, a great deal of the inserting small teeth are required, not only increasing costs of elements, assembly, and stockpile, but also leading to poor fixation. The inserting small teeth must tightly contact with the permanent magnets to ensure effective fixation. However, fabrication precision errors continue and end up with a cumulative count. Therefore, the permanent magnets are susceptible to vibration and looseness which are even more severe in the presence of the abovementioned external surrounding factors or pressure.

Taiwanese Patent No. 579131 disclosed a coupling fixing motor rotor comprising: coupling grooves formed inside exiting magnetic grooves of magnetically permeable elements of a turning axle; a coupling flange formed on an inner rim of an opening end of each of the coupling grooves; auxiliary positioning elements corresponding in shape to the magnetically permeable element and adapted for coupling and hooking up to each other, wherein the auxiliary positioning elements are long enough to couple and hook up with only one end of the permanent magnets but are absent from the magnetic grooves nor disposed between the permanent magnets.

However, the prior art entails tapering the permanent magnets functioning as magnetic members such that the permanent magnets can be pressed down and fixed in position to each of the coupling grooves, thereby allowing stress to focus on end of the permanent magnet; but for those permanent magnets made from micro particles by powder metallurgy, when stress is concentrated on end, it is likely to cause the end to crack, thereby ruining fixing effect; in addition, when the technique is adopted, a grinding wheel is commonly applied for sharpening ends of the permanent magnets, it is unlikely to obtain a preferable matching level between the permanent magnets and the coupling grooves, thereby leading to poor fixing effect and further decreasing the yield of motor rotors.

Taiwanese Patent No. M302825 disclosed a permanent magnet rotor structure, wherein dovetail tenons are formed on bottom surface of permanent magnets, and corresponding dovetail mortises are formed on a peripheral wall surface of a turning axle for correspondingly coupling with the permanent magnets; however, the patent here has same drawback shown in the claims of Taiwanese Patent No. 579131, which incapable of providing preferable fixing effect, and it is obviously more difficult in achieving the fabrication technique and precision demand.

A magnetic fixing device for motor is disclosed according to Taiwanese Patent No. M312835, wherein permanent magnets are held between two hollow pressing rings, one of the two hollow pressing rings has a plurality of protruding posts formed on its ring surface and equidistantly spaced apart from one another, the protruding posts each comprise two coupling portions on both lateral surfaces respectively and a fixing hole between the two coupling portions, and the other hollow pressing ring comprises axial fixing holes; also each of the permanent magnets has coupling portions on both lateral sides corresponding in position to the coupling portions for correspondingly coupling to between two neighboring protruding posts, and a plurality of fastening elements, e.g. screws, are applied separately to correspondingly run through each of the fixing holes, thereby fixing in position and integrating the hollow pressing rings to one entity, and fixing in position and clipping the permanent magnets between the two hollow pressing rings.

However, screws are applied to the prior art, and screws are likely to be magnetically permeable and consequently affect magnetic fields; besides, applying screws needs tool, and a great deal of amount of screws needed for assembly, thereby costing more time and energy and consequent inconvenience in fabrication process. Besides, eight screws are required according to the prior art, and in order to balance center of gravity, screws applied in assembly must be of same weight, and likewise corresponding nut applied; therefore, choosing of elements is very critical, and even inside a same batch, commonly there are elements of different weight; also a specific technique and procedure must be adopted for purpose of selecting proper elements, thereby increasing fabrication time and cost; moreover, motor rotor must keep rotational motions alive while operating, and the continuous rotational motions and vibrations together are very likely to loosen up the screws, consequently causing displacement of the permanent magnets and affecting usage life spans of motor and motor rotor.

Furthermore, the prior art disclosed a permanent magnet functioning as a magnetic member, between two neighboring posts, in other words, only applicable to motor rotors that have permanent magnets equidistantly spaced apart from one another, but not applicable to motor rotors that have permanent magnets coupled to one another, for instance, motor rotor shown by FIG. 1 in the specification of Taiwanese Patent No. 484766, thereby limiting application scope of the prior art.

In view of the abovementioned drawbacks of the prior art, it is a highly urgent issue in the industry as to how to provide a technique for fabricating motor rotor, which is capable of ensuring fixing effect, reducing elements of assembly, simplifying structure, providing easy assembly process, preventing usage life spans of motor and motor rotor from being affected by external surroundings factors, preventing magnetic members from cracking, and also enhancing the yield.

SUMMARY OF THE INVENTION

In view of the disadvantages of the prior art mentioned above, it is a primary objective of the present invention to provide a motor rotor capable of fixing magnetic members in position firmly.

It is another objective of the present invention to provide a motor rotor characterized by simplified structures and a reduced number of constituent elements.

It is a further objective of the present invention to provide a motor rotor characterized by a streamlined assembly process and reduced assembly costs.

It is still another objective of the present invention to provide a motor rotor capable of protecting magnetic members from cracking and damage in an assembly process, thereby enhancing the yield.

It is still another objective of the present invention to provide a motor rotor with a life life span not susceptible to factors of external surroundings.

To achieve the aforementioned and other objectives, a motor rotor is provided according to the present invention; the motor rotor comprises: a turning axle with a peripheral wall surface and two end surfaces; a plurality of magnetic members circumferentially disposed on the peripheral wall surface, wherein each of two ends of each of the magnetic members is formed with a first fastening portion; and two fastening members coupled to the two end surfaces of the turning axle respectively, wherein each of the fastening members is formed with a plurality of second fastening portions corresponding in position to the first fastening portions.

According to the present invention, the turning axle of the motor rotor selectively comprises a plurality of magnetically permeable elements stacked and concatenated with one another, wherein the magnetically permeable elements can be silicon steel sheets; and the magnetic members can be permanent magnets, wherein the magnetic members can be arc-shaped and correspond in shape to the peripheral wall surface.

There are variations in the structure of the magnetic members and the fastening members. For instance, in one embodiment, each of the first fastening portions can be a stepped portion, while each of the second fastening portions can be a corresponding opening; and elevation of the first fastening portions at both ends of each of the magnetic members can selectively be the same or different; in another embodiment, one of the first fastening portions of each magnetic member is convex, but the other one of the first fastening portions of each magnetic member is concave, for example, one of the two first fastening portions is a bump, but the other one of the two first fastening portions is a groove; in a further embodiment, both the first fastening portions of each of the magnetic members are grooves, and both the second fastening portions are bumps, wherein the first fastening portions at the two ends of each of said magnetic members are selectively equal or unequal in sunken depth.

According to the present invention, the fastening members of the motor rotor can be non-magnetically permeable sheet metal members or plastic members, for instance, the fastening members are sheet metal members made of aluminum, copper, zinc, tantalum, or stainless steel. Besides, the turning axle further comprises a first coupling portion, and each of the two fastening members s comprises a second coupling portion corresponding in position to the first coupling portion. In one embodiment, the first coupling portion is an opening, and the second coupling portion is an opening or a protruding post; wherein the turning axle comprises a plurality of magnetically permeable elements stacked and concatenated to one another. The first coupling portion is formed at the magnetically permeable elements at the two ends of the turning axle. Each of the fastening members is formed with an opening penetrated by the turning axle, and the second coupling portion is disposed between the opening and the second fastening portion. The second coupling portion and the opening are coaxial. In another embodiment, the turning axle comprises a plurality of magnetically permeable elements stacked and concatenated to one another and penetratedly connected to a main axle; the first coupling portions are through holes formed in the main axle, while the second coupling portions are hollow protruding posts extended from the openings and formed with through holes corresponding in position to the first coupling portions. The motor rotor further comprise a bolt penetrating the first coupling portions and the through holes of the second coupling portions.

According to the present invention, the first and the second fastening portions and the first and the second coupling portions can be modified in various embodiments by those skilled in the art.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those skilled in the art after reading the disclosure of this specification. The present invention can also be performed or applied by other different embodiments. Numerous modifications and variations of the present invention can be devised without departing from the spirit of the present invention.

First Embodiment

Figure 1:
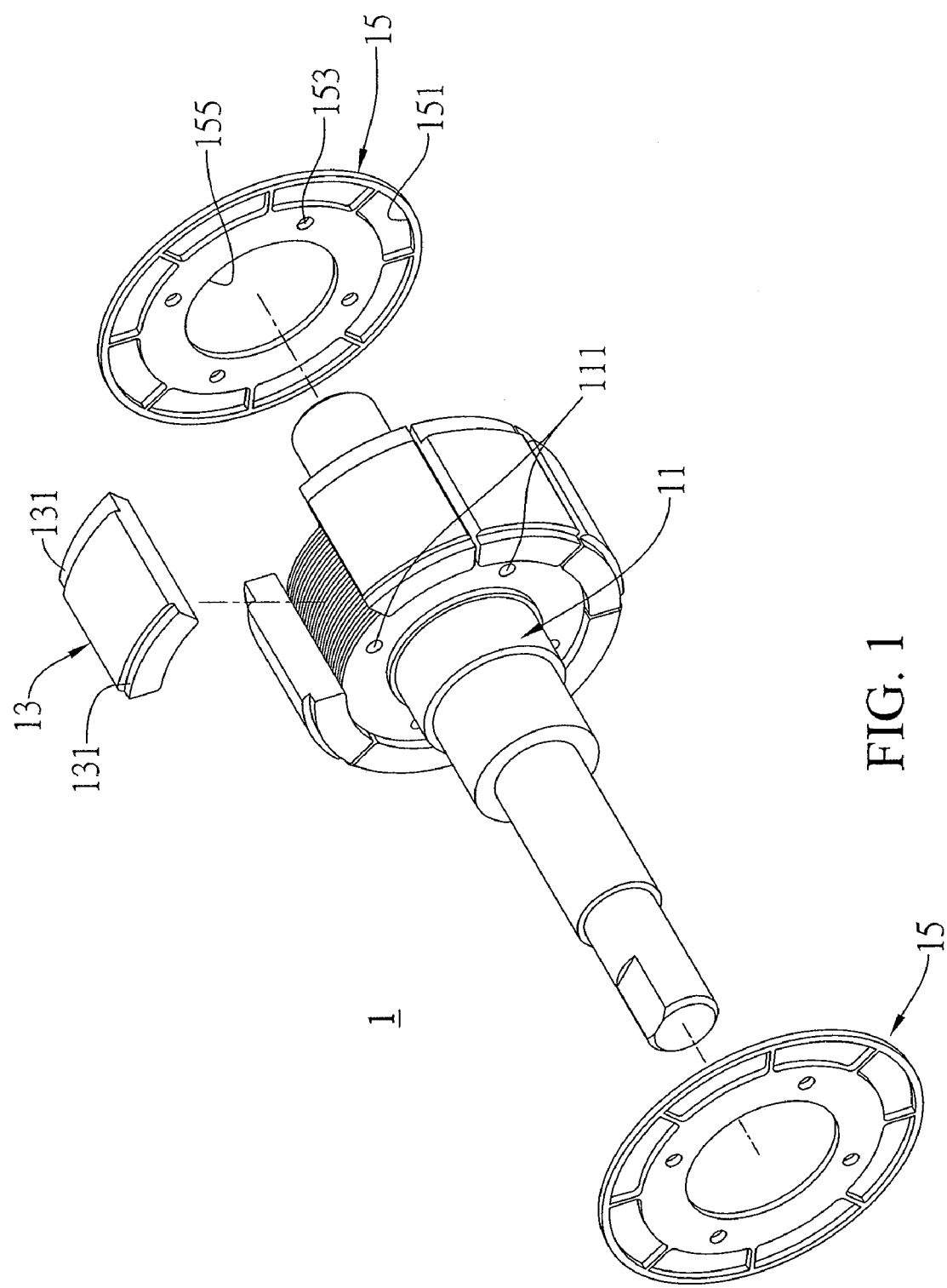
FIG. 1 is an exploded view of a first embodiment of the motor rotor of the present invention.
Figure 2:
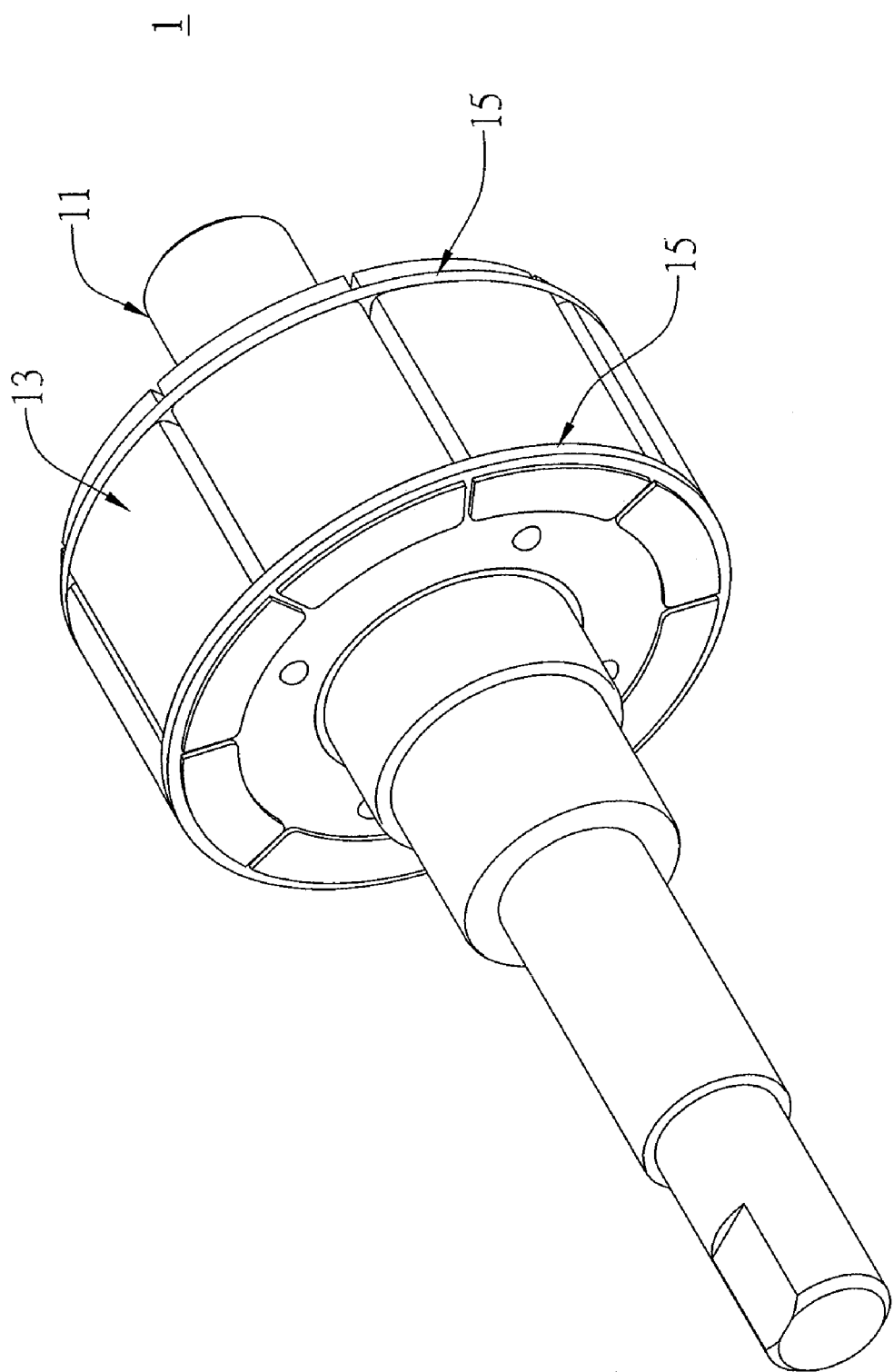
FIG. 2 is a schematic view of the assembled motor rotor shown in FIG. 1.
Figure 3:
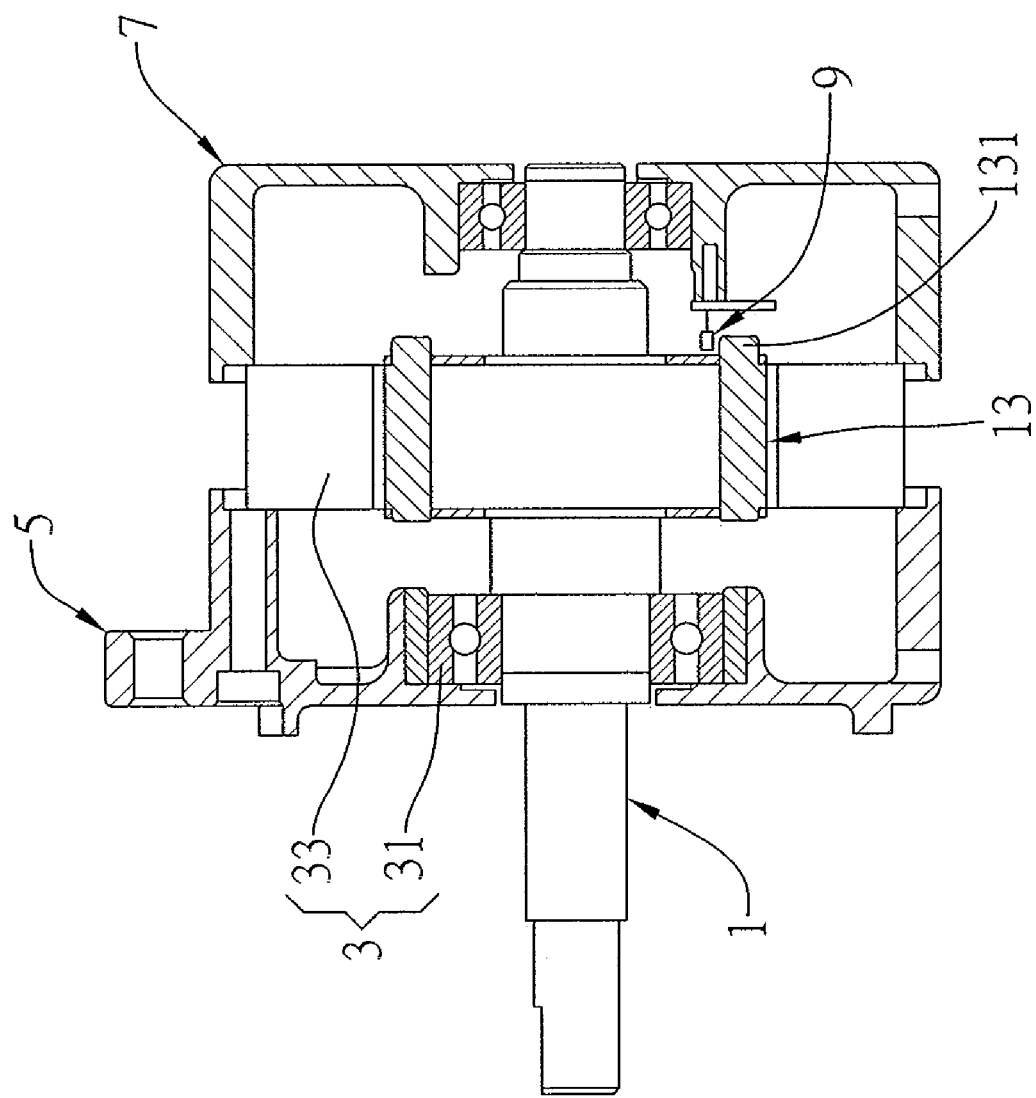
FIG. 3 is a cross-sectional view of the motor rotor shown in FIG. 1 and applied to a motor.

Please refer to FIGS. 1 through 3, which are schematic views of the first embodiment of the motor rotor of the present invention. As shown in FIG. 1, a motor rotor 1 provided by the present invention comprises a turning axle 11, a plurality of magnetic members 13 disposed on the surface of the turning axle 11, and two fastening members 15 coupled to end surfaces of the turning axle 11 to fix in position the magnetic members 13 respectively.

The turning axle 11 has a peripheral wall surface and two end surfaces. In the present embodiment, the turning axle 11 comprises a plurality of magnetically permeable elements stacked and concatenated to one another. Magnetically permeable elements in wide use are mostly silicon steel sheets, but it is not necessarily so in the present invention. The turning axle 11 is further formed with a first coupling portion 111. In the present embodiment, there are four first coupling portions 111 exemplified by openings, but the number of the first coupling portions 111 of the present invention is not limited to four. Besides, it is well known to those skilled in the art that silicon steel sheet commonly has this sort of openings for positioning and/or heat dissipation. Therefore, where this sort of silicon steel sheets are used in the present invention, there is no need to form any openings. In addition, the number, position, and size of the first coupling portions 111 are not restricted to the disclosures contained in the present embodiment.

Since the technique of stacking and concatenating silicon steel sheets together to form the turning axle 11 is well known to those skilled in the art but not a main feature of the present invention, detailed description and illustrations about the technique are omitted herein. There is no specific restriction on the structure of the turning axle 11. For instance, in addition to stacking and concatenating silicon steel sheets to each other to form the turning axle 11, the turning axle 11 can be integrally formed and made of silicon steel, but the feature is not restrictive of the present invention.

The plurality of magnetic members 13 are circumferentially disposed on the peripheral wall surface of the turning axle 11. A first fastening portion 131 is formed at each of the two ends of each of the magnetic members 13. The magnetic members 13 are permanent magnets, for example. Each of the magnetic members 13 has a bottom surface gluedly bonded to the peripheral wall surface of the turning axle 11 and a top surface opposite to the bottom surface. In the present embodiment, the magnetic members 13 are arc-shaped and correspond in shape to the peripheral wall surface of the turning axle 11. The first fastening portions 131 are bumps formed at two ends of each of the magnetic members 13, and the first fastening portions 131 at the two ends of each of the magnetic members 13 are unequal in length.

The magnetic members 13 of the present embodiment can, for example, be formed by removing part of existing ready-to-use magnetic members, or by fabricating the magnetic members 13 with bumps at both ends. Hence, both existing magnetic members and structurally innovative magnetic members are applicable to the present invention. Referring to FIGS. 1 through 3, to enhance the yield, a corner rounding process is performed on both ends (e.g. margins, top edge, and corners) of each of the magnetic members 13, thereby providing the magnetic members 13 with round corners so as to facilitate insertion. However, the round corners are regarded as an optional design choice in any preferred embodiment.

The fastening members 15 are coupled to the two end surfaces of the turning axle 11 respectively. Each of the fastening members 15 is formed with a plurality of second fastening portions 151 corresponding in position and fixed in position to the first fastening portions 131, a plurality of second coupling portions 153 corresponding in position to the first coupling portion 111, and an opening 155 penetrated by the turning axle 11. The fastening members 15 are non-magnetically permeable sheet metal members, plastic members, or other non-magnetically permeable equivalent members. For instance, the fastening members 15 can be sheet metal members made of aluminum, copper, zinc, tantalum, stainless steel, or other non-magnetically permeable metal. In the present embodiment, each of the first fastening portions 131 is a stepped portion, and the second fastening portions 151 are each openings corresponding in position to the first fastening portions 131. The first fastening portions 131 are slightly smaller than the second fastening portions 151 in order to be inserted into the second fastening portions 151, but the feature is not restrictive of the present invention. The second coupling portion 153 can be an opening corresponding in position to the first coupling portion 111 and is formed between the opening 155 and the second fastening portion 151. The second coupling portion 153 and the opening 155 are coaxial.

The fastening members 15 of the present embodiment can be fabricated by means of a sheet metal stamping technique, wherein fabrication allowance is allowed for in a stamping process. Hence, the yield of the assembly process is not affected despite a fabrication error, thereby overcoming the drawback of the assembly process of prior art. Since the sheet metal stamping technique is well known to those skilled in the art, related detailed description is omitted herein.

To assemble the motor rotor 1, the plurality of magnetic members 13 are glued to the peripheral wall surface of the turning axle 11, and then both the fastening members 15 are passed through both ends of the turning axle 11 respectively via the openings 155 of the fastening members 15, thus allowing the fastening members 15 to be coupled to the end surfaces of the turning axle 11 respectively with a view to fixing the magnetic members 13 in position. Riveting the first coupling portions 111 and the second coupling portions 153 together by means of a riveting technique finalizes the assembly of the motor rotor 1 as shown in FIG. 2.

Referring to FIG. 2 again, the fastening members 15 of the motor rotor 1 are coupled to the end surfaces of the turning axle 11, and the plurality of magnetic members 13 are circumferentially disposed on the peripheral wall surface of the turning axle 11 and equidistantly spaced apart from one another. It should be noted that the riveting technique applied in the present embodiment for coupling the fastening members 15 to the end surfaces of the turning axle 11 is intended to illustrate one of the embodiments of the present invention, but is not to restrict the application of the present invention.

The motor rotor 1 of the present invention is applicable to, e.g. brushless DC motor (BLDC) or any other motor that adopts magnetic members as a means to provide magnetic fields. Referring to FIG. 3, a motor comprise: the motor rotor 1, a stator 3, a first receptacle 5, a second receptacle 7, and a sensor 9. It should be noted that the motor shown in the drawing is to illustrate an applicable embodiment of the present invention, but is not to restrict the present invention; in other words, the present invention is also applicable to motors of any other structures.

The stator 3 comprises a bearing 31 and a coil 33. The bearing 31 is a sleeve bearing, a ball bearing, or any other proper bearing. The first receptacle 5 and the second receptacle 7 together receive the bearing 31. The motor rotor 1 is disposed on the bearings 31 and is capable of free rotation so as to generate magnetic motions together with the coil 33. The sensor 9 is disposed on the second receptacle 7 and is near one end of each of the magnetic members 13 with longer ones of the first fastening portions 131, for sensing the motor rotor 1, thereby determining the actual rotation state of the motor rotor 1, and determining if positioning, etc.

Since both ends of each of the magnetic members 13 can be fixed in position to the turning axle 11 via the fastening members 15 respectively, the present invention is capable of avoiding displacement of each of the magnetic members 13, thereby ensuring a fixation effect.

It should be understood that the length of first fastening portions 131 at two ends of each of the magnetic members 13 are unequal to allow the sensor 9 to sense the first fastening portions 131 of relatively great length, though in other embodiments the first fastening portions 131 at two ends of each of the magnetic members 13 may be equal in length. Besides, the magnetic members 13 are not restricted to long straight strips as stated herein, but can also be long arc-shaped slanting strips and providing satisfactory surface contact effect likewise. In addition, a riveting technique is applied in the present embodiment for riveting each of the fastening members 15 to the turning axle 11, but the feature is not restrictive of the present invention, and thus variations are allowed in other embodiments.

Second Embodiment

In the second embodiment, structures that are different from the first embodiment are used such that each of the fastening members 15 is fixed in position to the turning axle 11. Constituent elements of the second embodiment, which are the same as or similar to those in the first embodiment, are denoted with the same or similar reference numerals, without detailed description.

Figure 4:
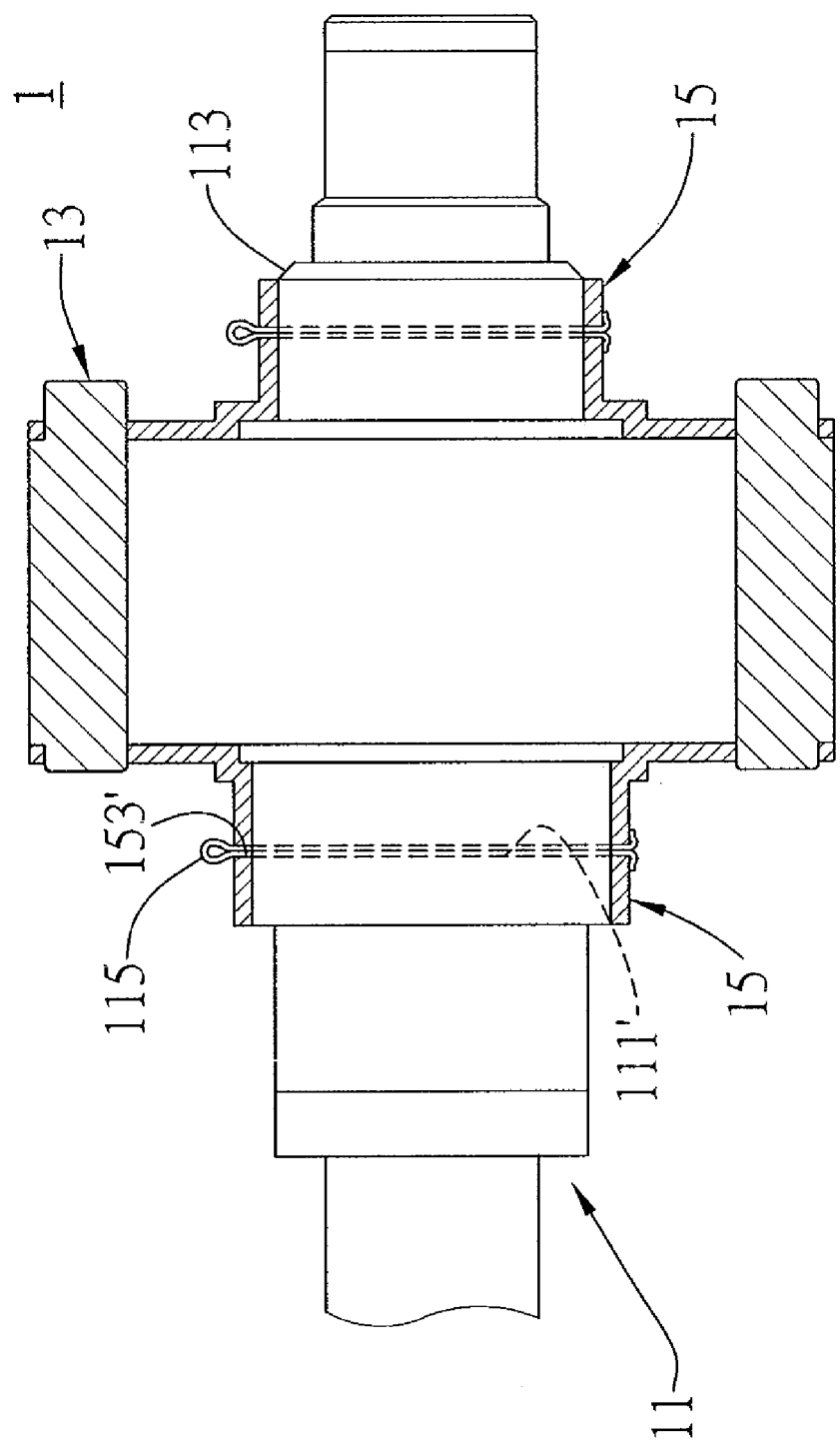
FIG. 4 is a cross-sectional view of the second embodiment of the motor rotor of the present invention.

Referring to FIG. 4, which is a cross-sectional view of the second embodiment of the motor rotor of the present invention, the turning axle 11 comprises a plurality of magnetically permeable elements (not shown) stacked and concatenated to one another and penetratedly connected to a main axle 113. First coupling portions 111' of the turning axle 11 can be a plurality of through holes formed in the main axle 113. Second coupling portions 153' of the fastening members 15 are hollow protruding posts extended from the opening 155 and formed with through holes corresponding in position to the through holes of the first coupling portion 111'. The motor rotor of the present invention further comprises bolts 115 penetrating the first coupling portions 111' and the through holes of the second coupling portions 153', thereby allowing the fastening members 15 to be fixed in position to the turning axle 11. The aforesaid fastening mechanism is applicable to those silicon steel sheets without any opening for positioning and/or heat dissipation, as well as those turning axles with openings formed at different positions, but inapplicable to the turning axle 11 of the first embodiment.

Although the second coupling portions 153' are formed on each of the fastening members 15 according to the present embodiment, the second coupling portions 153' can also be formed on only one of the fastening members 15, while the other fastening member 15 is formed with the second coupling portions 153 of the first embodiment; in other words, shapes of the two fastening members 15 can be symmetric or asymmetric to each other.

In the first and the second embodiments, each of the magnetic members 13 has bumps at both ends, and the fastening members 15 are formed with corresponding openings, the second fastening portions 151, for fixing the magnetic members 13 in position; however, shapes of the magnetic members 13 and the fastening members 15 are not restricted to as illustrated herein.

Figure 5A:
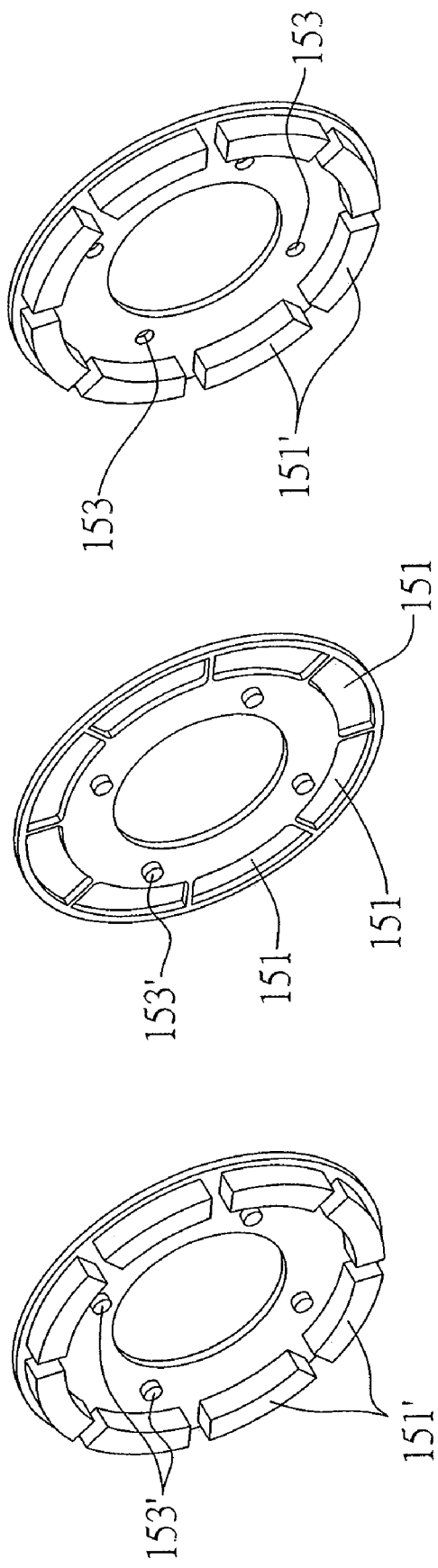
FIG. 5a is a schematic view illustrating a modified embodiment of the motor rotor of the present invention, wherein exemplary variations of fastening members are illustrated.

For instance, as shown in FIG. 5a, the second fastening portions 151' of the fastening members 15 can be, e.g. bumps, and elevations of the second fastening portions 151' is modifiable if necessary. The second coupling portions 153' can be, e.g. protruding posts, as opposed to the openings known as the second coupling portions 153. Where the fastening members 15 are plastic members with a certain degree of deformation elasticity, the second coupling portions 153' (i.e. the protruding posts) is inserted into the first coupling portions 111, thereby achieving fixation.

Figure 5B:
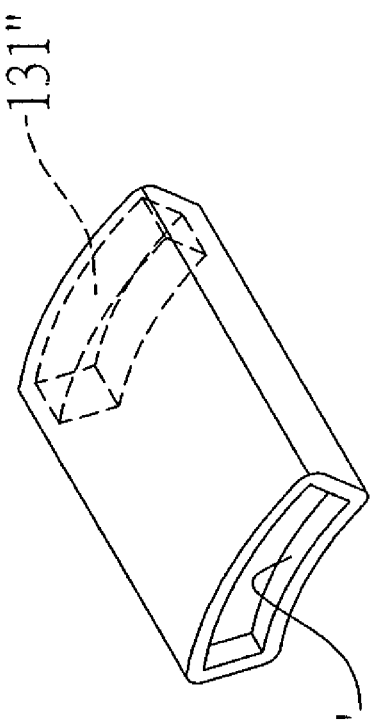
FIG. 5b is a schematic view illustrating another modified embodiment of the motor rotor of the present invention, wherein exemplary variations of magnetic members are illustrated.
Figure 5B:
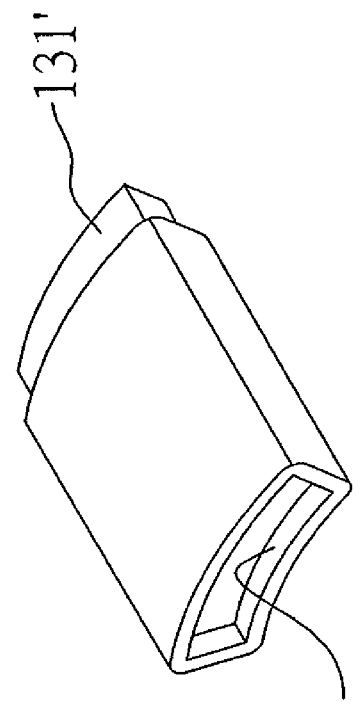

Furthermore, as shown in FIG. 5b, at one end of the magnetic member 13 is a convex first fastening portion 131', and at the other end of the magnetic member 13 is a concave first fastening portion 131"; in other words, a convex first fastening portion 131' is formed at one end of the magnetic member 13, and a concave first fastening portion 131" is formed at the other end of the magnetic member 13. The first fastening portion 131' is a bump, and the first fastening portion 131" is a groove. Alternatively, both ends of the magnetic member 13 are formed with the concave first fastening portion 131". The elevation of the first fastening portion 131' and sunken depth of the first fastening portion 131" are modifiable when necessary. When both ends of each of the magnetic members 13 are formed with the concave first fastening portions 131", the sensor 9 can selectively be provided at another location from where the sensor 9 is capable of sensing the first fastening portions 131".

In the aforesaid and modified embodiments, illustrations and descriptions are only intended for the motor rotor 1 with the magnetic members 13 being spaced apart from one another, but the disclosed features are not restrictive of the present invention.

Third Embodiment

Figure 6B:
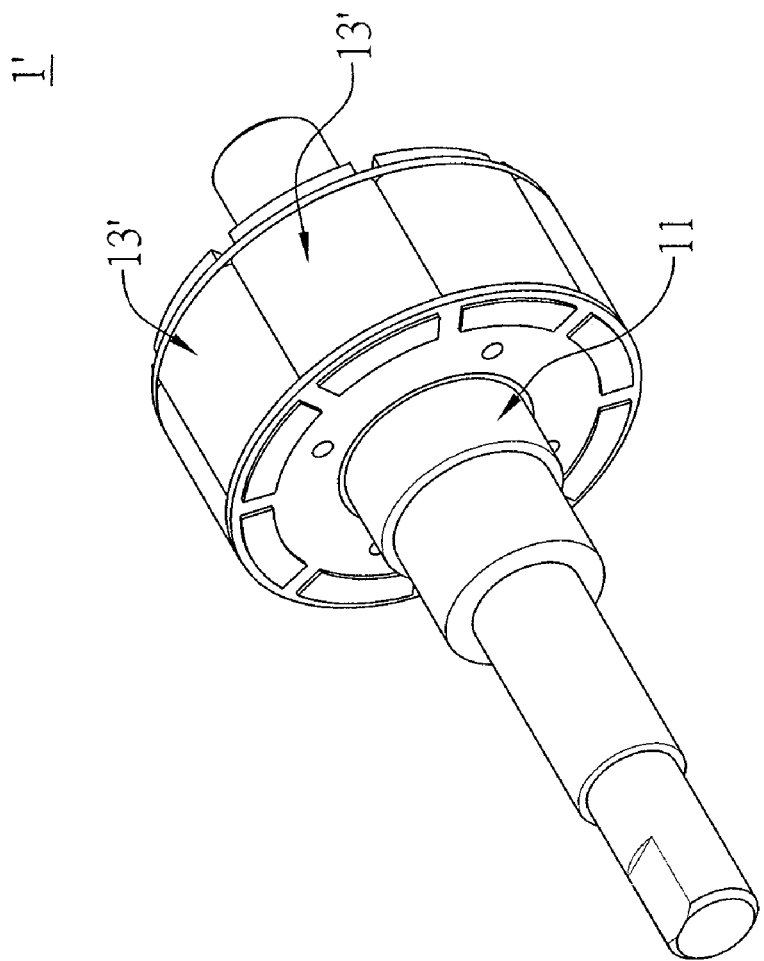
FIG. 6b is a schematic view of the motor rotor of the present invention, wherein the magnetic member of FIG. 6a is applied thereto.
Figure 6A:
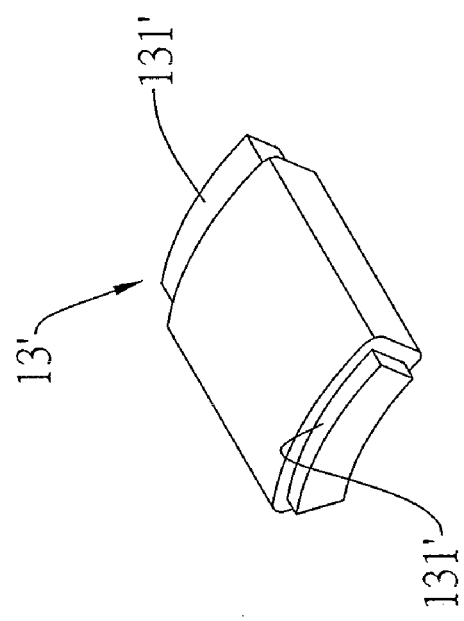
FIG. 6a is a schematic view of the third embodiment of the motor rotor of the present invention, wherein exemplary variations of magnetic member are illustrated.

Please refer to FIG. 6a, which is a schematic view of the third embodiment of the motor rotor of the present invention, wherein a variation of a magnetic member is illustrated. The main difference between the first and the second embodiments is that the convex first fastening portions 131' are formed at both ends of the magnetic member 13' so as to be applicable to a motor rotor 1' with magnetic members 13' coupled to one another. Besides, as shown in FIG. 6b, there is no gap between the magnetic members 13' circumferentially disposed on the peripheral wall surface of the turning axle 11, and thus the peripheral wall surface of the turning axle 11 is completely covered with the magnetic members 13'. Increasing the total area of the turning axle 11 covered by the magnetic members 13' modifies the induced electromotive force waveform and decreases breakdown torque, thus enhancing the efficiency of motors with specific polarity.

Elevations of the convex first fastening portions 131' at the two ends of each of the magnetic members 13' can be equal or unequal in length; likewise, sunken depths of the concave first fastening portions 131" at the two ends of each of the magnetic members 13' can be the same or different from each other. The variations are well known to and accomplishable by those skilled in the art, and therefore no further illustration nor description is provided herein.

Compared with prior art, the present invention is characterized by simple constituent elements, using fewer elements such as screws, and being applicable to a wide range of industries. The present invention provides design flexibility and is not restricted to structures illustrated in the foresaid preferred embodiments and modified embodiments. Part of the structures of the foresaid preferred embodiments and modified embodiments are replaceable and reversible and therefore comprehensible to and accomplishable by persons ordinarily skilled in the art, and thus no further illustration nor description is provided herein.

According to the present invention, magnetic members are fixed in position to fastening members by corresponding fastening portions, wherein fixation is maximized by a large fixation area of the magnetic members and a large fixation area of contact between the fastening members and a turning axle. Moreover, the present invention prevents the magnetic members from cracking which is otherwise common during a conventional assembly process, thereby stabilizing the magnetic members and prolonging the life of the motor rotor. In short, the motor rotor provided by the present invention overcomes drawbacks of the prior art.

The foregoing descriptions of the specific embodiments are only illustrated to disclose the features and functions of the present invention and not restrictive of the scope of the present invention. It will be apparent to those skilled in the art that all equivalent modifications or changes made, without departing from the spirit and the technical concepts disclosed by the present invention, should fall within the scope of the appended claims.

What is claimed is:

1. A motor rotor, comprising:
    a turning axle comprising a peripheral wall surface and two end surfaces;
    a plurality of magnetic members circumferentially disposed on said peripheral wall surface of said turning axle, wherein first fastening portions are formed at two ends of each of said magnetic members; and
    two fastening members coupled to said two end surfaces of said turning axle respectively and formed with a plurality of second fastening portions fixed in position to said first fastening portions respectively,
    wherein each of said first fastening portions is a stepped portion; each of said second fastening portions is a corresponding opening, and the stepped portions are exposed outside the fastening members when fixed in position to the corresponding openings.

2. The motor rotor of claim 1, wherein said turning axle comprises a plurality of magnetically permeable elements stacked and concatenated to one another.

3. The motor rotor of claim 2, wherein said magnetically permeable elements are silicon steel sheets.

4. The motor rotor of claim 1, wherein said magnetic members are permanent magnets.

5. The motor rotor of claim 1, wherein said magnetic members are arc-shaped and correspond in shape to said peripheral wall surface.

6. The motor rotor of claim 1, wherein said first fastening portions at the two ends of each of said magnetic members are equal in length.

7. The motor rotor of claim 1, wherein said first fastening portions at the two ends of each of said magnetic members are unequal in length.

8. The motor rotor of claim 1, wherein said first fastening portions formed at the two ends of each of said magnetic members are convex and concave respectively.

9. The motor rotor of claim 1, wherein each of said first fastening portions is a groove, and each of said second fastening portions is a bump.

10. The motor rotor of claim 9, wherein said first fastening portions at the two ends of each of said magnetic members are equal in sunken depth.

11. The motor rotor of claim 9, wherein said first fastening portions at the two ends of each of said magnetic members are unequal in sunken depth.

12. The motor rotor of claim 1, wherein the fastening members are one of non-magnetically permeable sheet metal members and plastic members.

13. The motor rotor of claim 12, wherein the fastening members are sheet metal members made of one selected from the group consisting of aluminum, copper, zinc, tantalum, and stainless steel.

14. The motor rotor of claim 1, wherein said turning axle further is formed with a first coupling portion, and each of said fastening members is formed with a second coupling portion corresponding in position to said first coupling portion.

15. The motor rotor of claim 14, wherein said first coupling portion is an opening, and said second coupling portion is an opening.

16. The motor rotor of claim 15, wherein said turning axle comprises a plurality of magnetically permeable elements stacked and concatenated to one another, and said first coupling portion is formed at magnetically permeable elements at two ends of said turning axle.

17. The motor rotor of claim 15, wherein each of said fastening members is formed with an opening for said turning axle to run through, and said second coupling portion is disposed between said opening and said second fastening portion.

18. The motor rotor of claim 17, wherein said second coupling portion and said opening are coaxial.

19. The motor rotor of claim 14, wherein said turning axle comprises a plurality of magnetically permeable elements stacked and concatenated to one another and penentratedly connected to a main axle, with the first coupling portions being through holes formed in in said main axle, and said second coupling portions being hollow protruding posts extended from said openings and formed with through holes corresponding in position to said first coupling portions.

20. The motor rotor of claim 19, further comprising bolts penetrating said first coupling portions and said through holes of said second coupling portions.

* * * * *